Figure 1:
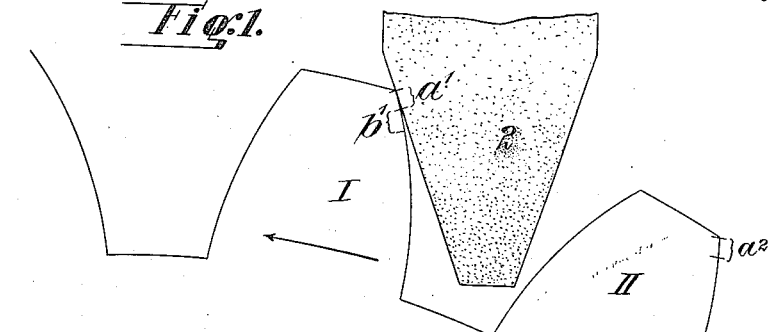

R. REINECKER & M. SCHÖNLEBER.
GEAR GRINDING MACHINE.
APPLICATION FILED MAR. 7, 1913.

1,150,535.

Patented Aug. 17, 1915.
5 SHEETS—SHEET 1.

Witnesses:
B. W. Dommers
E. Leckert.

Inventors
Richard Reinecker
Max Schönleber
By  Lemy oth Jr
Atty.

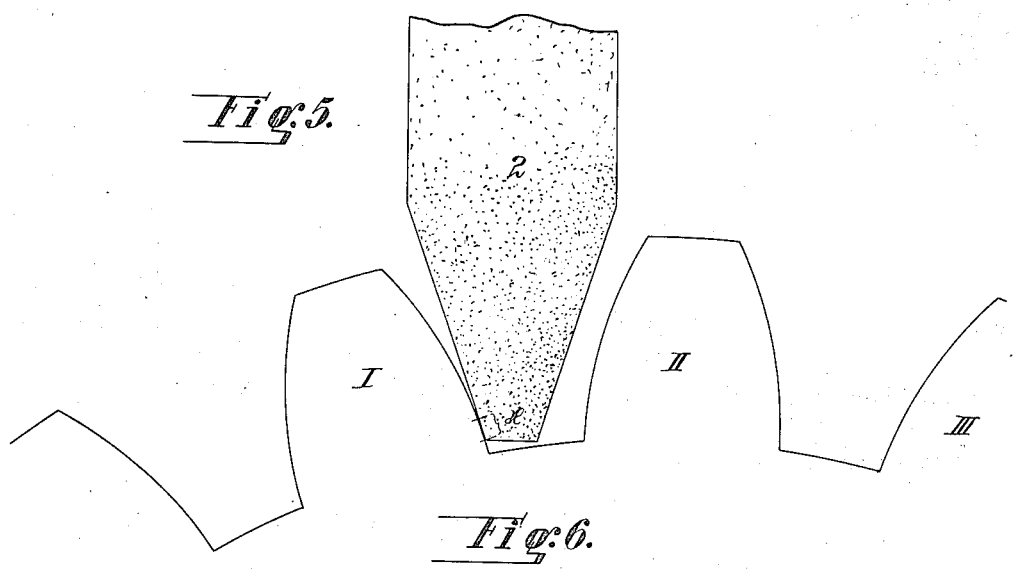
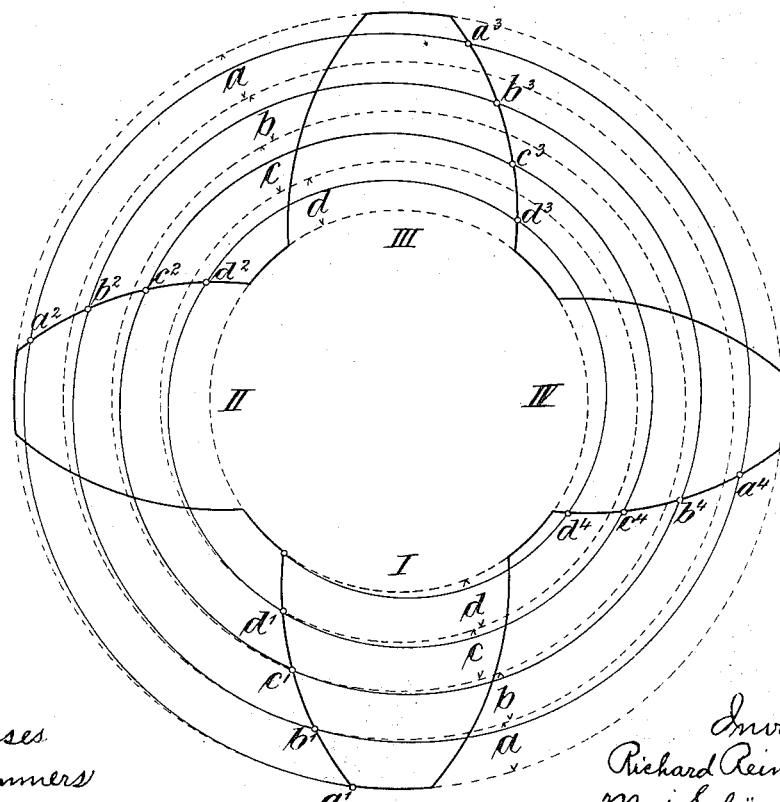

R. REINECKER & M. SCHONLEBER.
GEAR GRINDING MACHINE.
APPLICATION FILED MAR. 7, 1913.
1,150,535.
Patented Aug. 17, 1915.
5 SHEETS—SHEET 3.
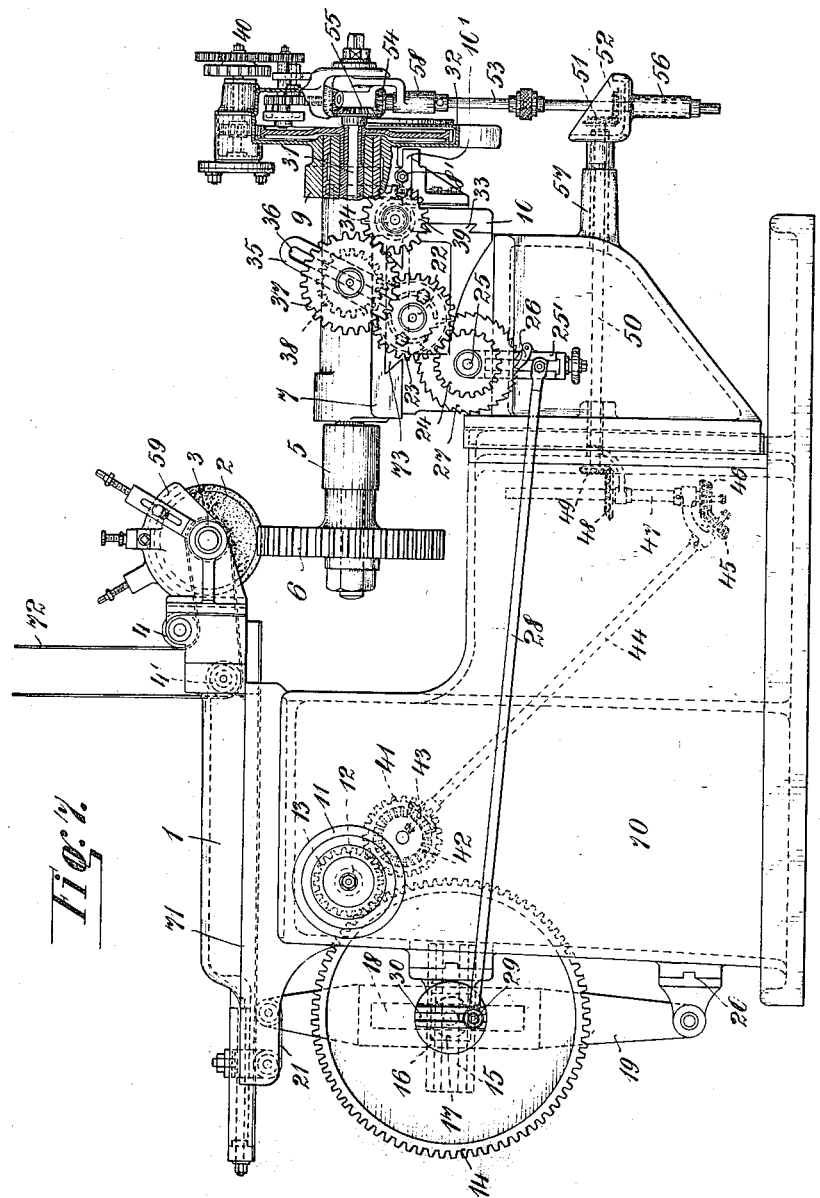
Witnesses
RW Sommers
E. Leckert
Inventors
Richard Reinecker
Max Schönleber
By Henry Otto Jr
atty

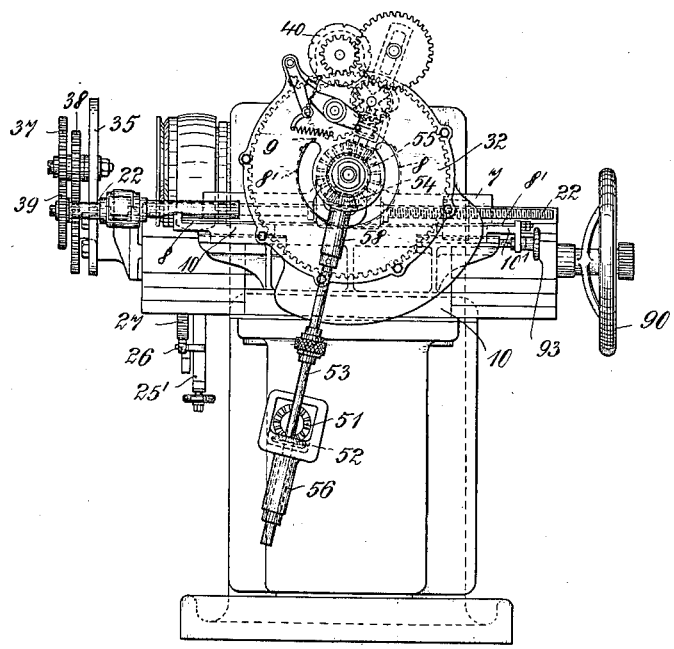

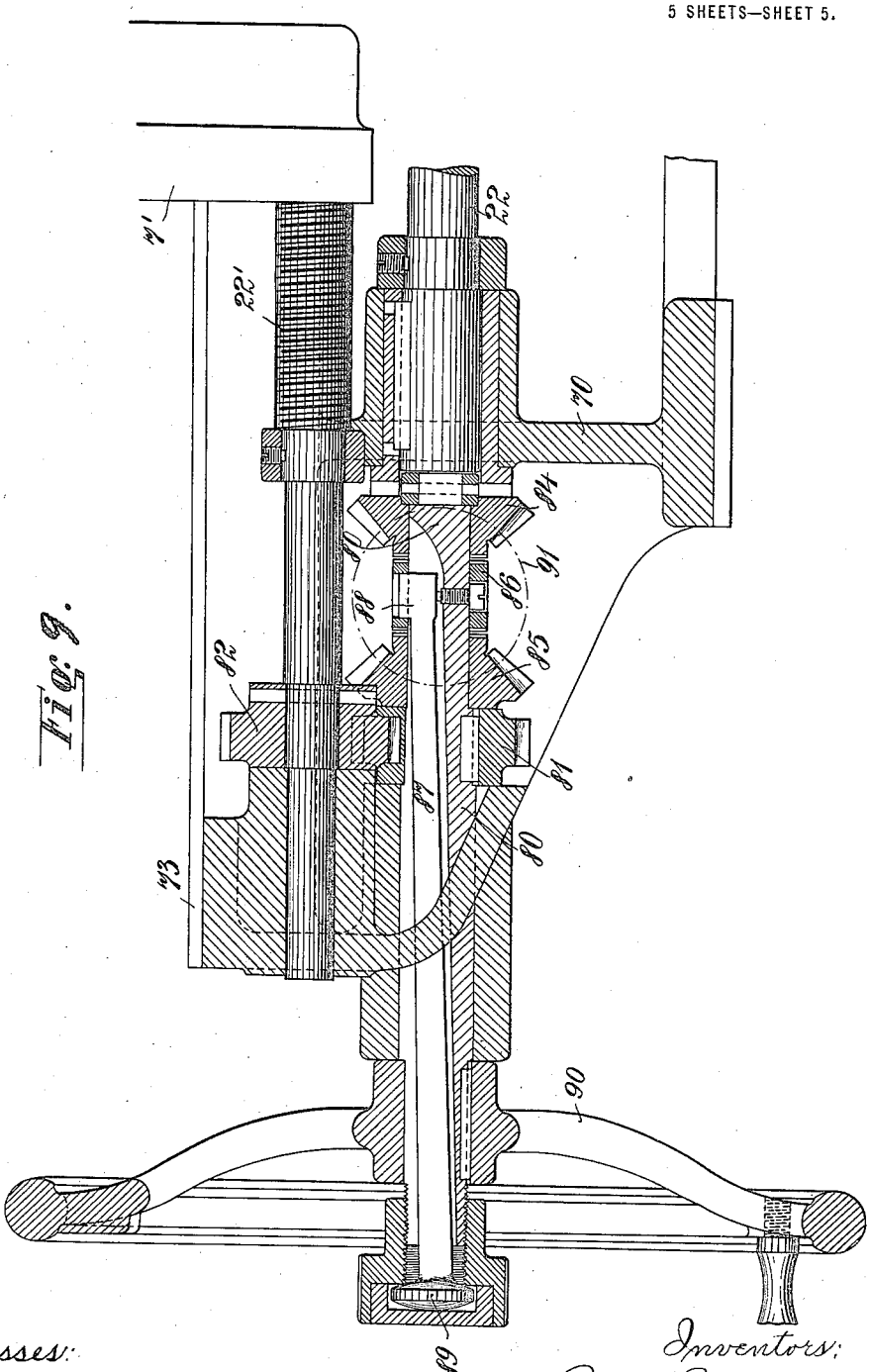

UNITED STATES PATENT OFFICE.

RICHARD REINECKER, OF CHEMNITZ-GABLENZ, AND MAX SCHÖNLEBER, OF CHEMNITZ, GERMANY.

GEAR-GRINDING MACHINE.

1,150,535.  Specification of Letters Patent.  Patented Aug. 17, 1915.

Application filed March 7, 1913. Serial No. 752,763.

*To all whom it may concern:*

Be it known that we, RICHARD REINECKER and MAX SCHÖNLEBER, citizens of the German Empire, respectively residing at Chemnitz-Gablenz and Chemnitz, in the Kingdom of Saxony, Germany, have invented certain new and useful Improvements in Gear-Grinding Machines; and we do hereby declare the following to be a full, clear, and exact description of the invention, such as will enable others skilled in the art to which it appertains to make and use the same.

Our invention relates to improvements in gear grinding machines, and more particularly in machines which embody the principle of evolution.

The machine described hereinafter is particularly designed for grinding gears which have already been cut. In some cases such gears must be ground over again in order to obtain accuracy in the form of the teeth. This is necessary for example where the gear wheels are tempered after being cut, because they change their form by the tempering process.

In machines of the class herein described the gear wheels are cut or ground in such a way, that on a tool the outline of which has the form of the teeth of a rack, that is of a truncated wedge, the gear wheel is made to roll with its pitch line, while the tool performs the cutting operation.

In machines now in use the gear wheels are ground in such a way that the tool, for example a grinding disk the outline of which has the form of the teeth of a rack, is made to completely grind at first one face of one tooth while gradually proceeding relatively to the tooth from the outer circumference of the wheel to the root of the tooth, whereupon the adjacent surface of the next tooth is cut in a similar way by gradually retracting the tool relatively to the tooth from the root of the latter to the outer circumference of the wheel. Thereupon the gear wheel is rotated through the space of one tooth, and the surface of the next tooth is completely ground in the same way. It will readily be understood, that in the course of the grinding operation the tool is gradually worn off, so that the amount of material ground from the blank is gradually reduced, and the thickness of the teeth is gradually increased. Therefore adjacent to the tooth which has first been ground and which therefore has the correct shape there is a tooth which has last been ground and which is too thick. This is objectionable in the operation of the gear wheel.

The object of the improvements is to provide a machine for grinding gear wheels in which this objection is avoided. And with this object in view our invention consists in providing a machine in which the wear of the tool is uniformly distributed over all the teeth, so that all the teeth have a uniform shape. In carrying out the invention each tooth is not completely ground before the tool is applied to the next one, as has heretofore been done, but after performing one cut, that is after the tool has once been passed over a tooth transversely of the gear wheel, the latter is rotated through a space corresponding to the pitch of the wheel and it is simultaneously rolled off a small amount relatively to the tool, whereupon a single cut is made on the corresponding section of the next tooth. This operation is repeated until the tool arrives again on the face of the first tooth and in position for grinding the following section of its surface.

For the purpose of explaining the invention more in detail a machine embodying the same has been shown in the accompanying drawings, in which the same letters of reference have been used in all the views to indicate corresponding parts.

Figure 2:
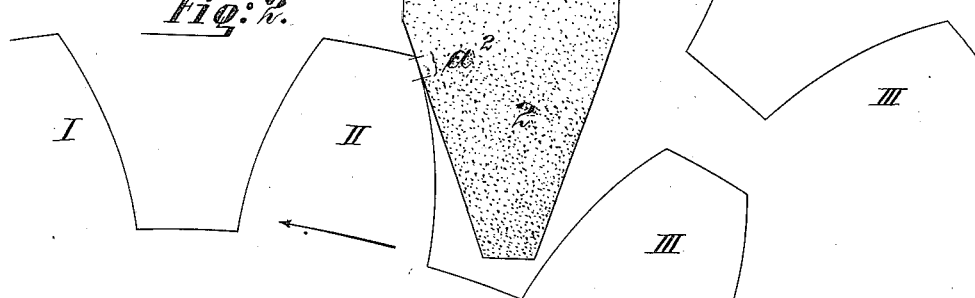
Figure 3:
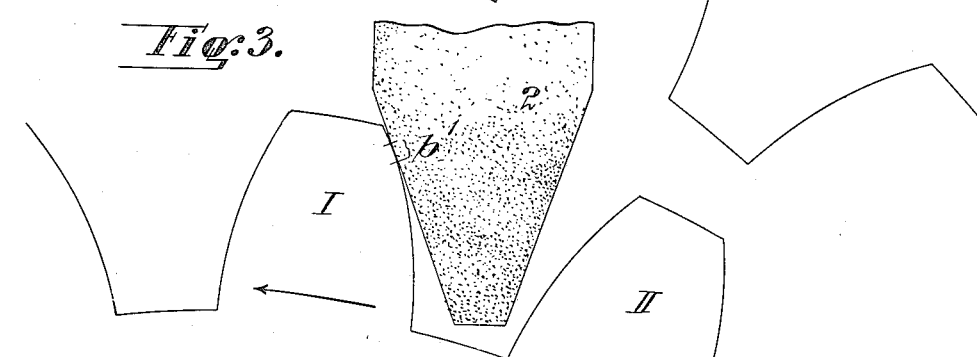
Figure 4:
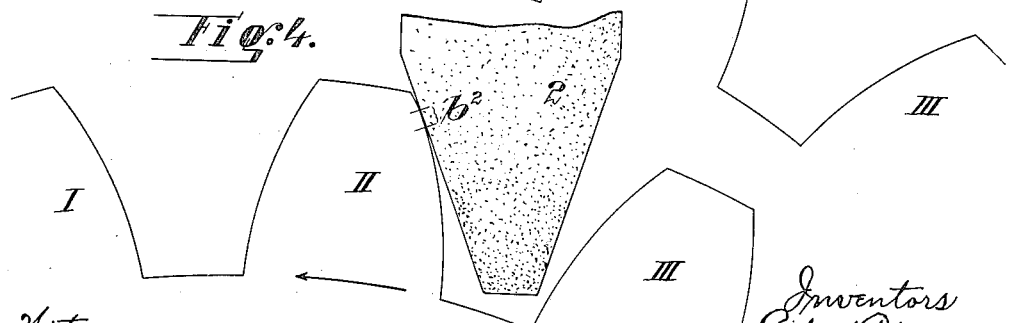

In said drawings—Figures 1 to 5, are diagrammatical views of the tool and a part of the teeth operated upon by the tool, Fig. 1 showing the tool in position for grinding the first section of the first tool, Fig. 2 showing the same in position for grinding the first section of the second tooth, in which position the tool has been slightly advanced relatively to the said section as compared to its position relatively to the first section of the first tooth, Fig. 3 showing the tool after having ground the first sections of all the teeth and in position for grinding the second section of the first tooth, Fig. 4 showing the tool in position for grinding the second section of the second tooth, the tool being slightly advanced relatively to the said section as compared to its position on the second section of the first tooth, and Fig. 5, showing the tool in position for grinding the last section of the first tooth, Fig. 6, is a diagrammatical front view of a gear wheel having four teeth, a spiral line indicating the gradual progress of the tool relatively to the sections of the successive teeth, Fig. 7, is a front view of the machine partly in section, Fig. 8, is a side view of Fig. 7 seen from the right, and Fig. 9 is a partial cross-section of the part of the machine frame on which the blank holder is supported.

Before describing the machine which is used for carrying out our improved method we shall at first describe the improved method of grinding the gear teeth of the gear wheel, reference being had to Figs. 1 to 6 of the drawings. It may be assumed, that the tool 2 is at first applied to the tooth indicated by the numeral I, where it grinds by its first stroke the first section of the surface of the tooth I, which section has been indicated in Fig. 1 by the letter $a^1$. According to the old method the gear wheel would be so rolled off relatively to the tool, that the tool would grind by its second stroke the second section of the tooth I, which section has been indicated by the letter $b^1$. This operation would be continued, until the whole surface of the tooth were ground.

According to our improved method the wheel is rotated through a distance corresponding to the pitch of the wheel, after the tool has ground the first section $a^1$ of the first tooth I, so that for the second stroke the tool is applied to the first section $a^2$ of the second tooth II. If now the tool were applied exactly to the same part of the section $a^2$ which corresponds to the part of the section $a^1$ of the first tooth to which the tool was applied, the same part of the cutting surface of the tool would be used for grinding the first section $a^2$ of the second tooth, and in the same way the said part of the cutting surface would grind the corresponding sections of all the following teeth. Therefore the tool would be worn off at the part of its surface which corresponds to the first sections of the teeth in the same way, as if the whole surface of each tooth were completely ground before the tool is applied to the next tooth. To avoid this the blank is slightly rolled off relatively to the tool, while being advanced from one tooth to the next one, so that the part of the section of the surface of the blank which is engaged by the tool is gradually changed. This rolling movement can be an intermittent one or a continuous one. By reason of this rolling movement the sections $a^2$, $a^3$, $a^4$, etc., of the consecutive teeth are slightly displaced relatively to one another and to the section $a$ of the foregoing tooth, each succeeding section being a little nearer the root of the tooth than the section of the foregoing tooth. The amount of this displacement is very small. It is equal to the length of one section divided by the number of the teeth of the blank. In Fig. 6 we have illustrated this part of our improved method. For the purpose of illustration it has been assumed, that each tooth is ground in four sections. Corresponding sections of all the teeth form zones $a$, $b$, $c$ and $d$ which in the figure have been indicated by concentric dotted lines. The number of the teeth of the wheel is four. Accordingly each zone has been divided in four equal parts. The figure shows, how the points of contact of the tool and the blank, $a^1$, $a^2$, $a^3$, $a^4$, $b^1$, $b^2$, etc.. are gradually shifted in the successive teeth, so that the points are disposed on a spiral line indicated in the figure in full lines. For each complete rotation of the blank the spiral is advanced toward the root of the tooth a distance corresponding to one zone. On tooth I the cut is performed at the outer end of the section $a$, the point of contact between the tool and the blank having been indicated by the letter $a^1$. After the blank has been rotated through a space corresponding to the pitch of the gear wheel and applied to the surface of the tooth II, it has also been slightly rolled off relatively to the tool, so that the latter is now applied to the second tooth in the point $a^2$, and so on. Therefore after a complete revolution the tool has arrived at the end of the first zone $a$, so that the second zone $b$ is now ground by the tool in the same way as the zone $a$. It will readily be understood, that the number of the zones corresponds to the number of rotations of the wheel which is necessary for completely grinding the same. The degree of the rolling movement which is performed by the wheel for each partial rotation thereof from one tooth to the next one corresponds to the breadth of the zone divided by the number of the teeth.

In practical operation the number of the zones is so large and therefore their breadth so small, that the section of the teeth, which theoretically is a polygonal line, is practically a curve. As the tool advances from a point $a^1$ of a tooth to the next point $b^1$ of the same tooth, the point of contact of the tool passes theoretically speaking from one zone of the tool to another one. Practically however the cutting zones of the tool merge into each other, so that the border line of one of the zones is always slightly in advance of the adjacent border line of the succeeding zone. Therefore the cutting zone of the tool is practically composed of two zones one of which has already been partly worn off, while the succeeding one has still its original form. Thereby the wear of the tool is uniformly distributed over all the teeth and teeth of uniform shape and thickness are obtained.

In Figs. 1 and 2 we have shown the tool 2 in the position relatively to the teeth I and II, in which the first zones $a^1$ and $a^2$ of the teeth are being cut. Figs. 3 and 4 show the position of the tool relatively to the second sections $b^1$ and $b^2$ of the teeth I and II. Fig. 5 shows the position of the tool when cutting the last zone of tooth I.

In Figs. 7 and 8 we have shown a machine which is suitable for putting our improved method into effect. As shown the machine consists of the following elements: The blank 6 is mounted on a blank holder 5 which has three different movements: First it has a rotary movement. Second the blank holder has a motion of translation which as shown is an intermittent one, though our invention is not limited to this particular feature. The motions of translation and rotation are combined to impart to the blank a rolling motion. Third, the blank has an intermittent rotary motion which is imparted thereto by means of a spacing head 40 of any known or preferred construction, and which advances the blank through a space corresponding to the pitch of the gear wheel or blank, whenever a cut has been made by the tool, so that the cuts made by the tool are successively made on all the teeth.

The tool 2, such as a grinding disk, is mounted on a ram 1 which has a reciprocating movement transversely of the blank. All of these parts and their driving mechanisms are suitably mounted on a frame 70.

While in the example shown in the drawings the blank has three different motions, and the tool has a reciprocating movement, we wish it to be understood, that our invention is not limited to the construction shown in the drawings.

The reciprocating ram 1 which at its front end carries the grinding disk 2 is mounted on suitable guide ways 71. The disk 2 is adapted to be rotated by means of a gearing consisting of a belt 72, a pulley 3 mounted on the axis of the disk 2, and guide rollers 4 and $4^1$. The disk 2 is inclosed with its upper part in a casing 59 which in the example shown in the drawings is equipped with guide ways for diamond holders 60 provided for readjusting the grinding disk in case of wear, without removing the same from the machine.

Reciprocating movement is imparted to the ram 1 from a belt pulley 11. The latter is keyed to a shaft 12 mounted in suitable bearings of the machine frame. The shaft carries a gear wheel 13 which is in engagement with a gear wheel 14 keyed to a shaft 17. The gear wheel 14 is provided with a slotted member 15 within which a block 16 can be adjusted at different distances from the center of the gear wheel 14. The block 16 engages a slot 18 provided in a rocking lever 19 which has a fulcrum at its lower end on a bracket 20. At its upper end the rocking lever 19 is connected with the ram 1 by means of a link 21. Rotary movement is transmitted from the belt pulley 11 to the block 16 through the intermediary of the gear wheels 13, 14. By the engagement of the block 16 with the slotted lever 19 a larger or smaller rocking movement is imparted to the lever 19, according to the adjustment of the block 16 relatively to the center of the gear wheel 14, and this reciprocating movement is transmitted to the ram 1, so that the tool 2 is passed along the surfaces of the teeth of the blank 6 being ground. The rolling motion and the stepwise rotary motion of the blank are performed in such a way, that the blank makes a complete rotation, while performing a very small rolling motion, so that a definite section of the surface of each tooth is acted upon by the grinding disk, until finally the whole surface of each tooth has been ground. For performing these movements the blank arbor is mounted on a transversely reciprocating slide 7 on which it has rotary movement. The rotation is produced by means of Bilgram bands 8 and 8' which with one of their ends are secured to a disk 9. While in known constructions the bands are connected with their opposite ends to a relatively fixed part of the machine, we prefer to connect the same to a slide 10 which has transverse reciprocating movement in the same direction as the slide 7. In the operation of the machine the movements of the slides 7 and 10 are so combined into a resulting movement, that with different diameters of the pitch lines of the blanks correct rolling movements are produced. After the tool has made one cut on a tooth, the blank is advanced through a distance corresponding to the pitch of the gear wheel by means of a belt gearing 11 acting through the intermediary of the spacing head 40.

The slide 7 which carries the blank holder 5 is mounted on a suitable guide way 73 disposed transversely of the direction of the movement of the ram 1. For moving the slide a spindle 22' is provided which is in engagement with a screw threaded part with a nut 7' formed on the slide and which is suitably guided in the frame of the machine. In the example shown in the drawings intermittent movement is imparted to the slide 7. But we wish it to be understood, that our invention is not limited to means for imparting intermittent movement to the slide, and that if desired continuous movement may be imparted thereto. In the example shown in the drawings intermittent movement is imparted to the slide by the following mechanism: The spindle 22' is operatively connected with a spindle 22, as will be described hereafter with reference to Fig. 9, and to the spindle 22 a gear wheel 23 is keyed which is in engagement with a gear wheel 24 keyed to a shaft 25 mounted in suitable bearings of the machine frame. On the said shaft an arm 25' has a rocking support which carries a spring pressed pawl 26 engaging a ratchet wheel 27 keyed to the shaft 25. The free end of the arm 25' is connected by a link 28 with a block 29 which engages in a slotted member 30, provided on the gear wheel 14. According to the position of the block 29 within the slot 30 a larger or smaller transverse movement is imparted to the slide 7.

The blank holder 5 consists of an arbor 31 having a bearing support on the slide 7. To the rear end of the arbor 31 a disk 32 is secured which is made integral with the disk 9 to which the Bilgram bands 8 and 8' are connected. At their opposite ends the said bands are connected to the slide 10 which is guided on a transverse guide way 33 provided on the frame of the machine and is movable thereon in the same direction as the slide 7. Movement is imparted to the slide 10 from the spindle 22 by means of a spindle 34. A rocking arm 35 having a slot 36 is provided concentrically of the spindle 22. On the said arm change gear wheels 37 and 38 are supported which are respectively in engagement with the gear wheel 23 and a gear wheel 39 keyed to the spindle 34 by means of which the slide 10 is shifted. By providing change gears having different ratios of gearing the ratio of the movements of the slide 10 and the slide 7 can be changed. Thereby the degree of the rotation of the blank is changed as compared to a determined transverse movement thereof, which rotary movement is combined with the transverse movement to the desired rolling movement of the blank, which corresponds to the diameter of its pitch line. Therefore, by using two slides 7 and 10 we are enabled to impart to gear wheels of different pitch lines the correct rolling movement.

Whenever a cut has been performed by the tool on the surface of a tooth, the blank is rotated through the space corresponding to the pitch of the blank. For this purpose any desired mechanism may be provided. To show what may be done, we have shown in the drawings a spacing head 40 of the construction shown and described in the United States patent to Bilgram, No. 665,054, granted January 1st, 1901. As this construction is known in the art a detailed description is not necessary. The rotary movement is derived from the belt pulley 11 through the intermediary of the gear wheel 13, a gear wheel 41, conical gear wheels 42, 43, a rod 44, conical gear wheels 45, 46, a rod 47, conical gear wheels 48, 49, a rod 50, conical gear wheels 54, 55. At its lower end the rod 53 is guided in a bearing 56 which has a rocking support on a stud 57 projecting from the frame of the machine, so that the gear wheels 54, 55 are free to follow the transverse movement of the slide 7. Besides the rod 53 is longitudinally shiftable in its bearings. At its upper end it is guided in a bearing 58 which is rigidly mounted on the spacing head 40.

In the operation of the machine it is necessary that the slide 7 can be shifted by hand and independently of the feeding apparatus operated from the gear wheel 14, and that the direction of the travel of the slide can be reversed as compared to the rotation of the driving mechanism. Independent operation of the slide is necessary for example, when a blank has been secured to the blank arbor. In this case the blank must be set in its proper position relatively to the tool 2. The direction of the movement of the slide must be reversed for example after grinding one of the surfaces of the teeth of the blank and for grinding the opposite faces of the teeth. For this purpose the driving mechanism for the slide is equipped with mechanism as follows: The mechanism for reversing the direction of the travel of the slide 7 and for shifting the same independently of the driving mechanism represented by the ratchet wheel 27 and coöperating parts is illustrated in Fig. 12 of the drawings, in which a vertical cross-section of the part of the machine frame which carries the slide 7 and the guide way 73 of the slide are shown. In the said part of the machine frame the screw-threaded shaft 22' is mounted by means of which the slide 7 is shifted transversely of the axis of the blank arbor. Below the spindle 22' the spindle 22 is mounted in suitable bearings, which at the end not shown in the figure has the gear wheel 23 secured thereto, and which is provided for transmitting the rotary movement of the ratchet wheel 27 to the spindle 22'. In line with the spindle 22 a shaft 80 is mounted in suitable bearings of the machine frame, and the shaft 80 has a gear wheel 81 secured thereto which is in engagement with a gear wheel 82 secured to the spindle 22'. To the left hand end of the spindle 22 a bevel gear wheel 83 is keyed which is constructed in the form of a sleeve and loosely embraces the right hand end of the shaft 80. On the shaft 80 a bevel gear wheel 85 is loosely mounted which is operatively connected with the gear wheel 84 by means of a bevel gear wheel 86 suitably by means of a bevel gear wheel 86 suitably mounted on the machine frame. At their opposing faces the gear wheels 84 and 85 are formed with coupling jaws and between the said coupling jaws a coupling sleeve 86 is mounted on the shaft 80 which is longitudinally shiftable thereon but is adapted to impart rotary movement thereto. The sleeve 86 is adapted to be shifted longitudinally of the shaft 80 by means of a rod 87 which is located within a longitudinal bore of the shaft 80 and engages the sleeve 86 by means of a nose 88 provided at its inner end. At its outer end the rod 87 is provided with a nut 89 which is screwed on the outer end of the shaft 80 and permits the longitudinal adjustment of the rod 87 and the sleeve 86. The shaft 80 carries a hand wheel by means of which it can be rotated.

For correctly setting the blank with its teeth relatively to the tool, it is not sufficient to merely shift the slide 7, because thereby only rolling movement can be imparted to the blank. In order to be able to rotate the blank with its axis stationary the Bilgram bands 8 and $8^1$ are adjustably connected to the slide 10. This may be done in various ways. To show what may be done, we have shown in Figs. 7 and 8 a subsidiary slide $10^1$ which is mounted on suitable guide ways $33^1$ of the slide 10 and has the bands 8 and $8^1$ attached thereto. The slide $10^1$ is adapted to be set on its guide ways in different positions by means of a set screw 93. By thus shifting the slide $10^1$ the blank is rotated without performing a transverse shifting movement.

In the position of the parts shown in Fig. 12 the sleeve 86 has an intermediate position relatively to the gear wheels 84 and 85 and it is out of engagement with both gear wheels. Therefore the spindle 22 and the driving mechanism connected therewith are disconnected from the spindle $22^1$ and the slide 7. By rotating the hand wheel 90 the shaft 80 is turned and its rotation is transmitted through the gear wheels 81 and 82 to the screw-threaded spindle $22^1$ and the slide 7. Thereby the blank is rolled relatively to the tool, until its outer circumference or zone coincides with the part of the tool which is designed for cutting the first sections of the teeth. Now the slide $10^1$ is shifted by means of the set screw 93 so as to rotate the blank, until the tool is in engagement with the first section of the tooth to be cut. After the blank has thus been brought into the proper position, the rod 87 is shifted, so that the sleeve gets into coupling engagement for example with the gear wheel 80. If now the operation of the machine is started, the rotary movement of the shaft 22 is transmitted through the bevel gear wheel 84, the sleeve 86, and the gear wheels 81 and 82 to the spindle $22^1$ and the slide 7. After all the teeth have been ground on one side, the sleeve 86 is again shifted, so as to come into engagement with the gear wheel 85. Now the rotation of the spindle 22 is transmitted through the bevel gear wheels 84, 91, and 85, the sleeve 86, the shaft 80, and the gear wheels 81 and 82. It will readily be understood, that the direction of the rotation of the spindle $22^1$ and the slide 7 is now opposite to that which was imparted thereto before.

The operation of the machine is as follows: The blank to be ground is mounted on the blank holder 5 and adjusted thereon by means of the hand wheel 90 and the nut 93 such a position, that the tool 2 can perform a cut on the surface of the blank. The tool is rotated by means of its belt gearing represented in the drawing by the pulley 3. Now the machine is started by imparting rotary movement to the pulley 11. Such rotary movement is transmitted through the gear wheels 13 and 14 to the rocking lever 19. The rocking movement of the lever 19 is transmitted to the ram 1, so that the tool 2 performs a reciprocating movement. The stroke of the ram can be adjusted according to the dimension of the blank by adjusting the block 17 within the slot 15 at a larger or smaller distance away from the center of the wheel 14. While the ram 1 is thus being reciprocated relatively to the blank 6, the latter performs a rolling movement. This movement is derived from the gear wheel 14 which acts through the link 28 jointed at one end to the block 29 and with the opposite end to the rocking arm 25'. The rocking arm 25' imparts a stepwise movement to the ratchet wheel 27, which is transmitted through the gear wheels 24, 23 to the spindle 22, and from the latter to the spindle $22^1$ which engages with its screw-threaded part in the nut $7^1$ of the slide 7. The gear wheel 23 is operatively connected through the change gear wheels 37 and 38, the gear wheel 39, and the spindle 34 to the slide 10. By the transverse movement of the slide 7 the blank is shifted transversely of the tool, and as it is connected by the Bilgram bands 8 and 8' to the slide 10 which has a transverse movement relatively to the blank it is slightly rotated, and this rotary movement combines with the transverse movement into a rolling movement. The ratio of the rotary and transverse movements of the blank can be varied by changing the change gear wheels 37 and 38. Thereby correct rolling movements can be imparted to blanks of different diameters. After the tool has completed one cut on the first tooth of the blank, the latter is advanced through a space corresponding to the pitch of the blank, so that the second cutting stroke of the tool is performed on the second tooth. This feeding movement is derived from the pulley 11, and it is transmitted to the blank holder 5 through the rods 44, 47, 50, and 53, and the gear wheels connected therewith. The mechanism for transmitting this continuous movement into a stepwise rotary movement of the blank holder has been described in the aforesaid patent to Bilgram. Therefore a detailed description is not necessary. After the blank has thus been advanced, the tool acts on the second tooth. However, as the blank performs a rolling movement during the cutting operation, the cut made by the tool on the second tooth is slightly displaced as compared to the corresponding cut made on the first tooth. After a complete rotation of the blank on all the teeth a section has been cut which with reference to Figs. 1 to 6 has been described as the first section. When the second rotation of the blank begins, the tool is in position for performing a cut on the second section of the first tooth, and the same operation is repeated, until all the teeth have been completely ground.

In the example shown in the drawings the guide ways of readjusting diamonds 63 are disposed in relatively fixed positions. As shown on the head 59 of the ram which partly incloses the disk 2 guide ways are provided within which slides 60 and $60^1$ are adjustable by means of screws 61. The slides 60 and $60^1$ are formed with bores having internal screw-threads which are engaged by screws 62 having the diamonds 63 secured to their inner ends. The guide ways of the slides 60 and $60^1$ are disposed at angles which corresponds to the desired angles of the tool, and they may be either fixed on the head 59 or adjustable as to their angular positions. In the example shown in the drawings three diamonds 63 are provided, one of which is disposed in position for cutting the circumference of the tool, while the other ones are in positions for adjusting the lateral faces thereof.

The diamonds are adapted to be brought into inoperative positions away from the tool by means of the screws 61. If it is desired to readjust the tool 2, the slides 60 are shifted by means of the screw 61, so that the diamonds 63 are passed over the surface of the blank at the desired angles.

We claim herein as our invention:

1. In a machine for working the working surfaces of the teeth of gear wheels, the combination with a tool, of a blank holder, means to reciprocate said tool and work holder relatively to each other with the tool in working engagement with the working faces of the teeth of the blank, and automatic means operative after a section only of the working face of a tooth has been worked to shift said tool and blank holder relatively to each other with the tool into working engagement with another tooth of the blank.

2. In a machine for working the working surfaces of the teeth of gear wheels, the combination with a tool adapted to working corresponding sections of the working surfaces of the teeth of the gear wheels, of a blank holder, means to reciprocate said tool and work holder relatively to each other with the tool in working engagement with the working faces of the teeth of the blank, and automatic means operative after a section of the working face of a tooth has been worked to shift said tool and blank holder relatively to each other with the tool into working engagement with a different part of the corresponding section of the working surface of another tooth of the blank.

3. In a machine for grinding the working surfaces of the teeth of gear wheels, the combination with a tool the configuration of which corresponds to the form of the teeth of a rack, of a blank holder, means to reciprocate said tool and work holder relatively to each other, means to roll the tool and blank with their pitch lines on each other, and automatic means operative after a section only of a side face of a tooth has been ground to rotate said tool and blank holder relatively to each other so as to shift the tool from cutting position relatively to one tooth of the blank into cutting position relatively to another tooth of the blank.

4. In a machine for grinding the working surfaces of the teeth of gear wheels, the combination with a tool, the configuration of which corresponds to the form of the teeth of a rack, of a blank holder, means to reciprocate said tool and work holder relatively to each other, means to roll the tool and blank with their pitch lines on each other, and automatic means operative after a section only of a side face of a tooth has been ground to rotate said tool and blank holder relatively to each other so as to shift the tool from cutting position relatively to one tooth of the blank into cutting position relatively to another tooth of the blank, said rolling means being operative while the tool and blank are being rotated from position for cutting one tooth into position for cutting the other tooth.

5. In a machine for grinding the working surfaces of the teeth of gear wheels, the combination with a tool the configuration of which corresponds to the form of the teeth of a rack, a blank holder, means to reciprocate said tool and work holder relatively to each other, means to roll the tool and blank with their pitch lines on each other, and automatic means operative after each reciprocating movement to rotate said tool and blank holder relatively to each other so as to shift the tool from cutting position relatively to one tooth of the blank into cutting position relatively to another tooth of the blank.

6. In a machine for grinding the working surfaces of the teeth of gear wheels, the combination with a wheel blank supporting member having a motion of translation and formed with a curved surface, of a device having a motion substantially in the direction of said member, an elastic element secured with one end to said member and trained over the curved surface thereof and secured with its opposite end to said device, and means to change the ratio of the motions of said member and device.

7. In a machine for grinding the working surfaces of the teeth of gear wheels, the combination with a wheel blank supporting member having a motion of translation and formed with a curved surface, of a device having a motion substantially in the direction of said member, an elastic element secured with one end to said member and trained over the curved surface thereof and secured with its opposite end to said device, and means to shift the point of connection of the elastic band and device relatively to said member.

8. In a machine for grinding the working surfaces of the teeth of gear wheels, the combination with a slide and a wheel blank spindle provided with a curved surface; of a second slide movable parallel to the first slide and perpendicular to the axis of said spindle, Bilgram bands connected to said curved surface and whose ends are connected to said slide, adjusting means to adjustably connect one of said bands to said second slide, traversing means for said slides including means to cause the rate of movement of the second slide to be dependent upon the rate of movement of the first slide.

9. In a machine for grinding the working surfaces of the teeth of gear wheels, the combination with a slide and a wheel blank spindle provided with a curved surface; of a second slide movable parallel to the first slide and perpendicular to the axis of said spindle, Bilgram bands connected to said curved surface and whose ends are connected to said slide, adjusting means to adjustably connect one of said bands to said second slide, a traversing screw for each slide, a gear wheel on each screw and change gears meshing with each of said gear wheels.

In testimony whereof we hereunto affix our signatures in the presence of two witnesses.

RICHARD REINECKER.
MAX SCHÖNLEBER.

Witnesses:
C. O. BECK,
HEINR. MEYER.